(12) United States Patent
James

(10) Patent No.: US 7,685,684 B1
(45) Date of Patent: Mar. 30, 2010

(54) LINE ATTACHMENT SYSTEM

(76) Inventor: David W. James, 8558 E. Melody Ct., Claremore, OK (US) 74019

( * ) Notice: Subject to any disclaimer, the term of this patent is extended or adjusted under 35 U.S.C. 154(b) by 370 days.

(21) Appl. No.: 11/748,570

(22) Filed: May 15, 2007

(51) Int. Cl.
*F16G 11/00* (2006.01)
*A01K 91/04* (2006.01)
(52) U.S. Cl. .................. 24/129 R; 24/129 A; 43/44.85
(58) Field of Classification Search ............. 24/129 A, 24/129 R, 130; 43/44.85, 44.94
See application file for complete search history.

(56) References Cited

U.S. PATENT DOCUMENTS

| 269,399 | A | * | 12/1882 | Ensign ........................ 24/130 |
| 277,230 | A | | 5/1883 | Chubb |
| 521,704 | A | | 6/1894 | Davis |
| 757,820 | A | | 4/1904 | Lykke |
| 783,348 | A | * | 2/1905 | Wright ..................... 24/129 R |
| 796,342 | A | | 8/1905 | Miller et al. |
| 1,010,301 | A | | 11/1911 | Neats |
| 1,770,967 | A | * | 7/1930 | Bean ......................... 24/129 R |
| 2,142,776 | A | * | 1/1939 | Behnke ..................... 24/129 R |
| 2,164,949 | A | * | 7/1939 | Schreiber .................. 24/129 R |
| 2,735,208 | A | | 2/1956 | Bartletti |
| 2,996,825 | A | | 8/1961 | Tjernlund |
| 4,300,303 | A | | 11/1981 | Hutson |
| 6,269,523 | B1 | | 8/2001 | Benoit |
| 6,675,447 | B1 | | 1/2004 | Hofeldt |

* cited by examiner

*Primary Examiner*—Robert J Sandy
(74) *Attorney, Agent, or Firm*—Gable Gotwals

(57) ABSTRACT

An elongated shaft configured to receive the expeditious attachment of a line thereto, the shaft having adjacent to a first end a short length radially extending post, the shaft having a recess therein at the first end so that thereby the portion of the shaft from about the position of the post to the first end is tubular providing a tubular wall, and a V-shaped notch formed in the tubular wall, the notch extending from about the post to the shaft first end, the notch being configured to provide a portion of the tubular wall that is tooth-like, the post serving to receive a loop from a bight of the line after which the bight can be wrapped around the shaft and then looped in the notch and beneath the tooth-like portion, an end of the line extending out the shaft tubular end.

1 Claim, 3 Drawing Sheets

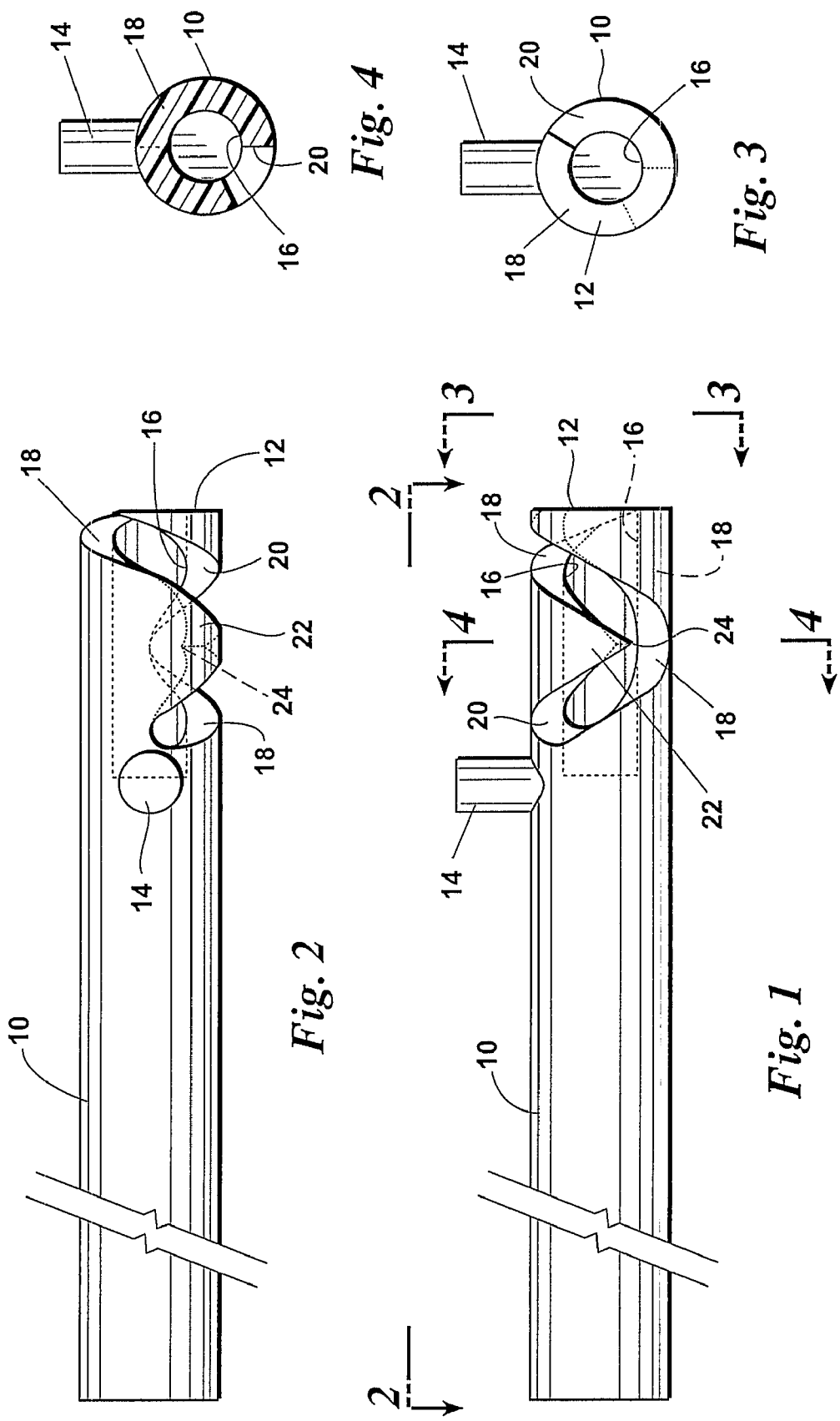

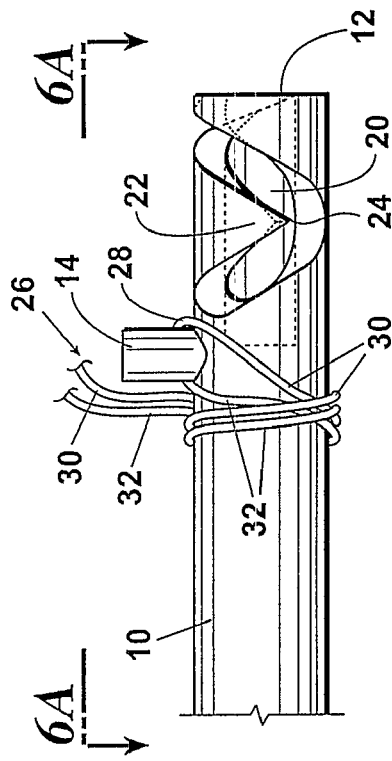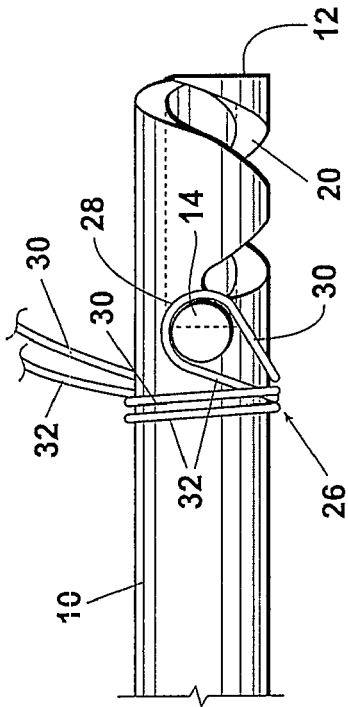
Fig. 5 Fig. 5A
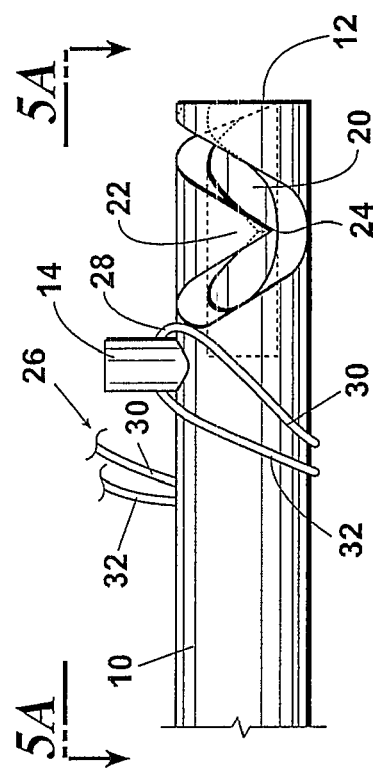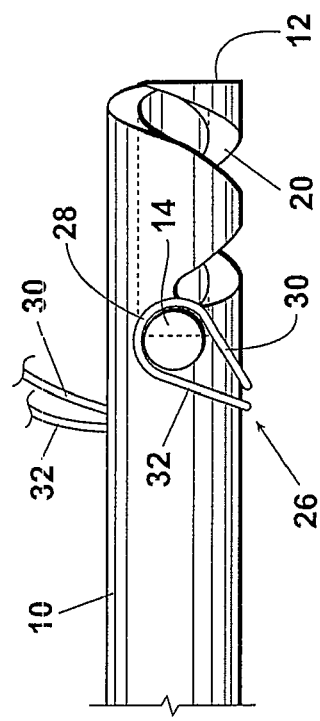
Fig. 6 Fig. 6A

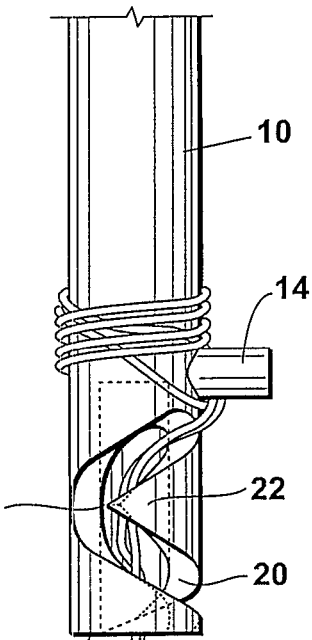
Fig. 9
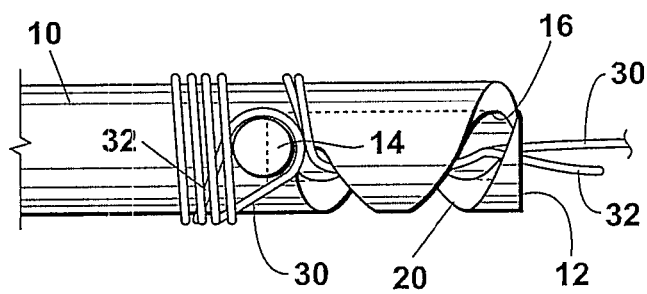
Fig. 7
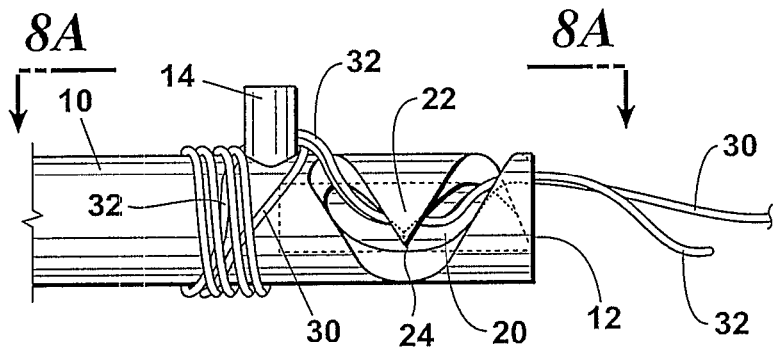
Fig. 8A
Fig. 8
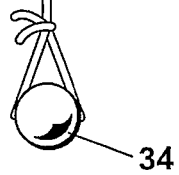

LINE ATTACHMENT SYSTEM

REFERENCE TO PENDING APPLICATIONS

This application is not based upon any pending domestic or international patent applications.

FIELD OF THE INVENTION

This invention relates to a system by which a line, such as a monofilament line, a string or a rope can be expeditiously attached to an elongated shaft.

BACKGROUND OF THE INVENTION

This invention is related to an elongated shaft configured to receive the expeditious attachment of a line thereto.

The need frequently arises for attaching a line to an elongated shaft. By the term "line" is meant a flexible string or rope such as a fishing line or a lanyard used in retaining sails or the like. A fishing line may be as simple as monofilament line or it can include a braided fishing line. Ropes are frequently braided as a way of adding together the tensile strength of individual fibers. An example of an application of the invention would be a system for attaching a fishing line to a fishing float in which the fishing float consists of a floatable bobber portion with a small diameter elongated shaft extending through the bobber. This type of fishing float has been in common use for many years. The invention herein provides a simple technique for very quickly and effectively tying a line to an end of the shaft that extends through the fishing bobber.

Others have provided devices for attaching lines to a solid object and for examples reference can be had to the following previously issued United States patents.

| U.S. Pat. No. | Inventor | Title |
|---|---|---|
| 277,230 | Chubb | Fishing Rod Tip |
| 521,704 | Davis | Line Guide For Fishing Rods |
| 757,820 | Lykke | Line Holder |
| 796,342 | Miller et al. | Tip For Fishing Rods or Poles |
| 1,010,301 | Neats | Clamp or Securing Device For Wire Cables and The Like |
| 2,735,208 | Bartletti | Fishing Rods |
| 2,996,825 | Tjernlund | Fishing Rod With Anti-Tangling Means |
| 4,300,303 | Hutson | Cane Fishing Pole Tip |
| 6,269,523 | Benoit | Reef Maker |
| 6,675,447 | Hofeldt | Apparatus To Adjust And Maintain Tautness Of A Serpentine Article |

BRIEF SUMMARY OF THE INVENTION

The invention herein is essentially an elongated shaft configured to receive the expeditious attachment of a line thereto. The elongated shaft has adjacent to a first end thereof a short length radially extending post. If the shaft is formed of material such as plastic the post may be integrally formed with the shaft. On the other hand if the post is formed of wood, the short length radially extending post may be formed of wood of smaller diameter than the shaft and can extend from a hole or recess formed in the shaft sidewall.

The shaft has a recess therein at the first end so that thereby the portion of the shaft from about the position of the post to the first end is tubular. This provides a portion of the shaft adjacent the first end having a tubular wall.

A V-shaped notch is formed into this tubular wall. The notch extends from about the post to the shaft first end. The notch is formed in the tubular wall. Further, the V-shaped notch forms an intermediate tooth-like portion of the tubular wall.

The post serves to receive a loop from a bight of a line. By a "bight" of a line means a loop at one end of the line whereby the line is doubled back upon itself for a short distance providing an integral loop. This loop formed by the bight of the line is received on the short length post. The line bight, that is the portion doubled back upon itself from the loop forming the bight, is then wound at least once but preferably twice around the shaft on the portion therein spaced past the post away from the first end of the shaft, that is, spaced away from the end of the shaft having the tubular wall therein. The bight of the line is then inserted into the V-shaped notch formed in the cylindrical wall of the shaft and beneath the integral tooth-like portion. The remaining length of the line bight is then extended out the tubular first end of the shaft.

These simple acts can be accomplished in seconds to securely attach one end of the line to the first end portion of the shaft. Thereafter the line cannot be removed from the shaft unless and until the bight portion is threaded out of the notch in the tubular sidewall and then unwound from around the shaft.

Attaching the line to the shaft can be done with a very minimal amount of dexterity, that is, far less dexterity than is required to form or tie a knot in a line. Further it can be done with minimal eyesight. Even a blind person that can feel the short length post extending from adjacent one end of the shaft can quickly attach the line to the shaft.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 1 is a fragmented elevational end view of one end portion of a shaft having the line attachment system of this invention incorporated therein.

FIG. 2 is a plan view of the end of the shaft as shown in FIG. 1, taken along the line 2-2 of FIG. 1.

FIG. 3 is an end view of the shaft having the line attachment system incorporated therein, as taken along the line 3-3 of FIG. 1.

FIG. 4 is a cross-sectional view taken perpendicularly the longitudinal axis of the shaft along the line 4-4 of FIG. 1.

FIG. 5 is an elevational view of the shaft as shown in FIG. 2 and showing a portion of the bight of a line looped over the short length radial extending post and illustrating the initial step in the attachment of a line to the shaft.

FIG. 5A is a top plan view of the portion of the shaft as shown in FIG. 5 and showing the first step in the attachment of the line to the shaft. FIG. 5A is taken along the line 5A-5A of FIG. 5.

FIG. 6 is an elevational view as in FIG. 5 showing the line bight after having been looped over the post and then wound once about the shaft.

FIG. 6A is a top plan view of the shaft having the bight of the line looped over the post and the line wound once about the shaft as shown in FIG. 6. FIG. 6A is taken along the line 6A-6A of FIG. 6.

FIG. 7 is an elevational view as in FIGS. 5 and 6 but showing the bight of the line having been wound twice around the shaft after having first been looped over the short length post.

FIG. 8 is an elevational view as shown in FIG. 7 but showing the line after having been looped over the post and wound twice around the shaft and then positioned in a V-shaped notch formed in the tubular wall of the shaft end portion with the line extending out the end of the shaft. FIG. 8 shows completion of the attachment of the line to the shaft.

FIG. 8A is a top plan view of the shaft of FIG. 8, taken along the line 8A-8A of FIG. 8 showing the line having been attached to the shaft.

FIG. 9 is an elevational view of the end portion of the shaft having the short length post and having a line looped around the post and extending out the bottom end of the shaft. FIG. 9 shows, as an example, a line having been attached to a post, the line shows an object affixed to the end thereof. The object illustrated, by way of example, is a fishing weight which could also be a fish hook or any other object secured by the line.

DETAILED DESCRIPTION OF A PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:

| | |
|---|---|
| 10 | Shaft |
| 12 | First end |
| 14 | Post |
| 16 | Recess |
| 18 | Tubular wall |
| 20 | V-shaped notch |
| 22 | Tooth-like portion |
| 24 | Tip |
| 26 | Bight of a line |
| 28 | Loop |
| 30 | Main portion of the line |
| 32 | Short portion of the line |
| 32A | End of short portion of the line |
| 34 | Object |

Referring to the drawings and first to FIGS. 1, 2, 3 and 4, a shaft configured to receive the expeditious attachment of a line thereto is illustrated. The shaft is indicated by the numeral 10 and can be of any material, such as wood, plastic, metal, etc. Shaft 10 may be of any diameter although typically the invention will be most commonly utilized to attach a line to a smaller diameter shaft that can be manually held during the attaching process. Shaft 10 has a first end 12. Adjacent to first end 12 is a short length radially extending post 14. Post 14 may be integrally formed with shaft 10 or may be a separate element attached to shaft 10. If, for example, shaft 10 is made of plastic, post 14 can be integrally formed with the shaft. If shaft 10 is made of wood, the short length post 12 can also be made of wood and in this case a hole (not shown) can be drilled in the shaft exterior wall to receive one end of short length post 14. The same is true if the shaft is made of metal. Whether integral or formed of a separate element and then attached to the shaft, post 14 remains affixed to the shaft while the shaft is being used to receive the attachment of a line.

Formed concentrically within the end portion of shaft 10 adjacent first end 12 is a recess 16. The recess 16 is preferably concentric to the external cylindrical wall of shaft 10 and can be formed in the shaft end 14 such as by drilling. The diameter of recess 16 is less than the external diameter of shaft 10 so that the recess provides a tubular wall 18. The tubular wall 18 in the end portion of shaft 10 extends from about the position of post 14 to the first end 12.

Formed in tubular wall 18 is a V-shaped notch 20. The notch 20 communicates with the shaft first end 12. Further, notch 20 is V-shaped, that is, it is shaped in a manner to provide a portion 22 that is tooth-like. Tooth-like portion 22 provides a tip 24 that extends in the direction towards the opposite side wall of the notch 20. This portion 22 that is termed "tooth-like" can also be considered an integral tongue portion of the tubular wall provided by the configuration of the notch. The notch includes a helical portion defined between the tip 24 and the first end 12.

FIGS. 1 through 4 illustrate the configuration of elongated shaft 10 having adjacent to a first end 12 therein a short-length radially extending post 14, the shaft having a recess 16 therein at the first end 12 with the recess providing a tubular wall 18 with a V-shaped notch 20 formed in the tubular wall.

FIGS. 5 through 8 show the method of attaching a line to the shaft having the configuration that is illustrated and described with reference to FIGS. 1 through 4. Turning now to FIGS. 5 through 8.

FIG. 5 is an elevational view of the shaft as described in FIGS. 1 through 4 having the bight of a line generally indicated by the numeral 26 looped over post 14.

The term "bight of a line" as used herein means a line such as a string, rope, etc. in which a short portion thereof looped back parallel to the main portion of the line forming an integral loop in the line. FIGS. 5 and 5A show the bight of the line having a loop 28 formed around post 14 with a line main portion 30 extending on one side of post 14 and a short length line portion 32 extending on the other side of the post, the line portions 30 and 32 forming loop 28 therein, the loop being positioned around post 14.

FIG. 6 shows the line bight 26 having the loop 28 over post 14 and with the main line portion 30 and the short length portion 32 forming the bight wrapped once around shaft 12. After the parallel line portions 30 and 32 forming bight 26 are first looped over post 14 and then wrapped twice around shaft 10, as shown in FIG. 7, the line portions 30 and 32 are then positioned within V-shaped notch 20 as shown in FIGS. 8 and 8A. Thus the parallel line portions 30 and 32 are looped beneath the tooth-like portion 22 of the tubular wall of the shaft so that after positioning the line portions 30 and 32 within the notch the line portions are completely within recess 16 and then extend out beyond shaft first end 12 as seen in FIGS. 8 and 8A. The line is then secured to the shaft 10.

FIG. 9 shows the final assembly with the main portion of the line 18 extending out the first end 12 of shaft 10. Line 30 is securely attached to shaft 10. The short portion 32 of the line that extends beyond end 12 of shaft 10 is not important or relevant. FIG. 9 shows an object 34 secured to the end of the main portion of the line 30. The object 34 is merely exemplary of any item that one would want to be attached to line 30, such as a fishing weight, fish hook, bobber, etc.

Thus the drawings clearly illustrate how a bight or looped portion of a line can be very quickly and expeditiously secured to the end portion of shaft 10 in a manner that does not require tying of a knot and does not require manual dexterity or good eyesight. A line can be secured to the end of shaft 10 by a blindfolded person.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. An elongated shaft configured to receive the expeditious attachment of a line thereto, comprising:

an elongated shaft having adjacent to a first end thereof a short length radially extending post;

said shaft having a recess therein at said first end so that thereby the portion of the shaft from about the position of said post to said first end is tubular providing a tubular wall; and a V-shaped notch formed in said tubular wall, the notch extending from about said post and a helical portion of the notch extending to said shaft first end, the notch being configured to provide a portion of said tubular wall that is tooth-like, said post serving to receive a loop from a bight of the line after which said bight can be wrapped around said shaft and then looped in said notch and beneath said tooth-like portion, an end of said line extending out said shaft tubular end.

* * * * *